US012104420B2

(12) United States Patent
Kim et al.

(10) Patent No.: US 12,104,420 B2
(45) Date of Patent: Oct. 1, 2024

(54) VEHICLE HINGE DRIVING APPARATUS

(71) Applicants: Hyundai Motor Company, Seoul (KR); Kia Corporation, Seoul (KR); Daedong Movel System Co., Ltd., Siheung-si (KR); PHA Co., Ltd., Daegu (KR)

(72) Inventors: Duck Young Kim, Hwaseong-si (KR); Ki Dong Kim, Incheon (KR); Oh Sik Kwon, Siheung-si (KR); Kyu Bum Kim, Siheung-si (KR); Kwang Hun Hong, Daegu (KR)

(73) Assignees: HYUNDAI MOTOR COMPANY, Seoul (KR); KIA CORPORATION, Seoul (KR); DAEDONG MOVEL SYSTEM CO., LTD., Siheung-Si (KR); PHA CO., LTD., Daegu (KR)

( * ) Notice: Subject to any disclaimer, the term of this patent is extended or adjusted under 35 U.S.C. 154(b) by 0 days.

(21) Appl. No.: 17/846,270

(22) Filed: Jun. 22, 2022

(65) Prior Publication Data

US 2023/0110103 A1 Apr. 13, 2023

(30) Foreign Application Priority Data

Oct. 12, 2021 (KR) ........................ 10-2021-0135107

(51) Int. Cl.
*E05F 15/00* (2015.01)
*E05F 15/614* (2015.01)

(52) U.S. Cl.
CPC ......... *E05F 15/614* (2015.01); *E05Y 2201/11* (2013.01); *E05Y 2201/434* (2013.01); *E05Y 2201/702* (2013.01); *E05Y 2201/71* (2013.01); *E05Y 2900/531* (2013.01)

(58) Field of Classification Search
CPC ..................................................... E05F 15/614
See application file for complete search history.

(56) References Cited

U.S. PATENT DOCUMENTS

| | | | |
|---|---|---|---|
| 7,028,573 | B2 | 4/2006 | Inaba et al. |
| 7,147,267 | B2 | 12/2006 | Bittner et al. |
| 7,690,709 | B2 | 4/2010 | Barral et al. |

(Continued)

FOREIGN PATENT DOCUMENTS

| | | | | |
|---|---|---|---|---|
| CN | 103228857 | * | 7/2013 | ............. E05F 15/63 |
| CN | 104968880 A | | 10/2015 | |

(Continued)

*Primary Examiner* — Daniel J Troy
*Assistant Examiner* — Daniel Alvarez
(74) *Attorney, Agent, or Firm* — SLATER MATSIL, LLP

(57) ABSTRACT

An embodiment vehicle hinge driving apparatus includes an actuator, a housing connected to the actuator, an output shaft rotatably mounted in the housing, and a transmission mechanism including a plurality of gear sets configured to transmit a torque from the actuator to the output shaft, wherein the plurality of gear sets includes a proximal gear set close to the actuator, a first distal gear set operatively connected to the proximal gear set, and a second distal gear set operatively connected to the first distal gear set, wherein the second distal gear set is detachably mounted and configured to respond to a required output torque, and wherein the output shaft is connected to the first distal gear set or the second distal gear set.

17 Claims, 19 Drawing Sheets

(56) References Cited

U.S. PATENT DOCUMENTS

| | | | |
|---|---|---|---|
| 8,585,124 | B2 | 11/2013 | Oberle et al. |
| 9,062,488 | B2 | 6/2015 | Sasaki |
| 2002/0180233 | A1 | 12/2002 | Benthaus et al. |
| 2006/0082186 | A1 | 4/2006 | Bals |
| 2013/0199321 | A1 | 8/2013 | Oberle et al. |
| 2014/0373454 | A1 | 12/2014 | Sasaki |

FOREIGN PATENT DOCUMENTS

| | | | | | |
|---|---|---|---|---|---|
| CN | 103228857 | B | | 5/2016 | |
| CN | 109882013 | A | | 6/2019 | |
| DE | 60028876 | | * | 11/2006 | ............ E05F 15/614 |

* cited by examiner

VEHICLE HINGE DRIVING APPARATUS

CROSS-REFERENCE TO RELATED APPLICATIONS

This application claims the benefit of Korean Patent Application No. 10-2021-0135107, filed on Oct. 12, 2021, which application is hereby incorporated herein by reference.

TECHNICAL FIELD

The present disclosure relates to a vehicle hinge driving apparatus.

BACKGROUND

A vehicle includes a door component such as a tailgate, a vehicle door, or a trunk lid, and a vehicle hinge mounted between the door component and a vehicle body. The door component may pivot on the vehicle hinge.

The vehicle hinge includes a hinge bracket, and a hinge arm pivotal around the hinge bracket through a hinge pin. The hinge bracket may be mounted on the vehicle body through fasteners and/or the like, and the hinge arm may be mounted on the door component through fasteners and/or the like. As the hinge arm pivots around the hinge pin, the door component may be opened and closed.

The door component may be divided into a manual door component which is driven manually by a user, and an electric door component which is driven by an actuator such as a motor. In particular, the electric door component includes a vehicle hinge driving apparatus for driving the hinge arm of the vehicle hinge, and the vehicle hinge driving apparatus may be directly connected to the hinge arm. As the hinge arm pivots by the vehicle hinge driving apparatus, the electric door component may be opened and closed.

The vehicle hinge driving apparatus according to the related art may be configured to transmit a torque of a drive motor to the vehicle hinge through a transmission mechanism including a complex geartrain. In particular, since the geartrain in the related art vehicle hinge driving apparatus has a complex structure, the volume or size of the vehicle hinge driving apparatus may relatively increase. Since the vehicle hinge driving apparatus has a relatively large volume or size, it may take up a relatively large portion in the space of the vehicle adjacent to the vehicle hinge, causing a significant loss of space in compartments adjacent to the door component. For example, when the related art vehicle hinge driving apparatus is connected to the vehicle hinge of the trunk lid, the vehicle hinge driving apparatus having a relatively large volume may extend into a trunk compartment adjacent to the vehicle hinge of the trunk lid. When the related art vehicle hinge driving apparatus is connected to the vehicle hinge of the tailgate, the vehicle hinge driving apparatus having a relatively large volume may extend into a headroom. When the related art vehicle hinge driving apparatus is connected to the vehicle hinge of the vehicle door, the vehicle hinge driving apparatus having a relatively large volume may take up a relatively large space in the vehicle door and interfere with a glass movement path in the vehicle door.

In addition, forward driving of the related art vehicle hinge driving apparatus may be smoothly performed using a frictional force between the gears, but reverse driving thereof may not be smoothly performed. The forward driving of the related art vehicle hinge driving apparatus may be performed by forward rotation of the drive motor, and the reverse driving thereof may be performed by reverse rotation of the drive motor.

Meanwhile, the related art vehicle hinge driving apparatus may protect the actuator from overload using a brake unit. However, the brake unit of the related art vehicle hinge driving apparatus may produce a relatively low brake torque, so it may be difficult to safely protect the actuator from overload.

The related art vehicle hinge driving apparatus may have a relatively low output torque (for example, 20 N·m) since it may be difficult to increase an overall gear ratio due to the arrangement of the geartrain, and efficiency of the geartrain may be lowered due to relatively high friction between the gears. Since the related art vehicle hinge driving apparatus has such a relatively low output torque, two vehicle hinge driving apparatuses are needed to drive a hinge mounted between a relatively heavy door component and the vehicle body, which may increase the overall manufacturing cost.

The above information described in this background section is provided to assist in understanding the background of the inventive concept, and may include any technical concept which is not considered as the prior art that is already known to those skilled in the art.

SUMMARY

The present disclosure relates to a vehicle hinge driving apparatus. Particular embodiments relate to a vehicle hinge driving apparatus for driving a vehicle hinge mounted between a door component (a tailgate, a vehicle door, a trunk lid, or the like) and a vehicle body that has a compact size to reduce a mounting space thereof and is easily applied to various door systems.

Embodiments of the present disclosure can solve problems occurring in the prior art while advantages achieved by the prior art are maintained intact.

An embodiment of the present disclosure provides a vehicle hinge driving apparatus having a compact size to reduce a mounting space thereof and minimize loss in the space of a vehicle adjacent to a vehicle hinge, and easily applied to various door systems.

According to an embodiment of the present disclosure, a vehicle hinge driving apparatus for driving a vehicle hinge mounted between a door component and a vehicle body may include an actuator, a housing connected to the actuator, an output shaft rotatably mounted in the housing, and a transmission mechanism including a plurality of gear sets transmitting a torque from the actuator to the output shaft. The plurality of gear sets may include a proximal gear set close to the actuator, a first distal gear set operatively connected to the proximal gear set, and a second distal gear set operatively connected to the first distal gear set. The second distal gear set may be detachably mounted to respond to a required output torque, and the output shaft may be connected to any one of the first distal gear set and the second distal gear set.

As one distal gear set of the two distal gear sets is detachably mounted so as to meet a required output torque, the output torque of the vehicle hinge driving apparatus may be easily varied. When a required output torque is varied according to types of vehicles, the vehicle hinge driving apparatus may appropriately respond to various types of vehicles.

The housing may have a first mounting end to which the actuator is mounted, a second mounting end to which the output shaft is mounted, and a cover which is detachably mounted to the second mounting end, and the cover may have a through hole through which the output shaft extends.

The output shaft may protrude outwards through the through hole of the cover, and thus the output shaft may be firmly connected to the vehicle hinge.

The cover may have a first side surface and a second side surface opposing each other, and the through hole may be closer to the first side surface than to the second side surface.

As the through hole is offset from a central vertical axis of the cover toward the first side surface of the cover, the position of the output shaft may be easily changed through the left-right reverse of the cover.

The housing may have a first output-side support recess and a second output-side support recess provided in the second mounting end, and the output shaft may be rotatably supported in any one of the first output-side support recess and the second output-side support recess.

The output shaft may be selectively and rotatably supported in any one of the two output-side support recesses, thereby easily responding to variations in output torque.

The proximal gear set may be a worm drive including a worm and a worm wheel, and each distal gear set may be a spur gear set.

As the transmission mechanism includes one or more worm drives and one or more spur gear sets, the torque transmitted from the actuator to the output shaft may significantly increase, which may allow the actuator to rotate at low speeds, thus effectively achieving noise reduction and high quality.

The housing may include an upper housing and a lower housing, and the upper housing may be detachably mounted to the lower housing through a plurality of fasteners.

Since the upper housing is detachably mounted to the lower housing, the assembly of the transmission mechanism and the housing may be easily performed.

The upper housing may have a plurality of upper cavities, and the lower housing may have a plurality of lower cavities. The plurality of upper cavities may correspond to the plurality of lower cavities, respectively. Each gear set may be received in each upper cavity and a corresponding lower cavity.

The transmission mechanism may include a plurality of transmission shafts by which adjacent gear sets are connected. At least one transmission shaft of the plurality of transmission shafts may be rotatably supported between the upper housing and the lower housing.

The upper housing may have an upper support recess, the lower housing may have a lower support recess, and at least one transmission shaft may be received between the upper support recess and the lower support recess.

The vehicle hinge driving apparatus may further include a hinge rod coupled to the output shaft, and the hinge rod may extend in a direction perpendicular to a central axis of the output shaft.

The hinge rod may have a through hole through which the output shaft extends, the output shaft may include a plurality of first projections and a plurality of first recesses alternately arranged in a circumferential direction thereof, and the hinge rod may include a plurality of second recesses and a plurality of second projections alternately arranged on an inner circumferential surface of the through hole in a circumferential direction thereof. The first projections of the output shaft may be fitted into the second recesses of the hinge rod, respectively, and the second projections of the hinge rod may be fitted into the first recesses of the output shaft, respectively.

As the hinge rod and the output shaft are coupled by serration coupling, the output shaft may be prevented from slipping in the through hole of the hinge rod in a rotation direction.

The output shaft may have an annular recess extending in the circumferential direction thereof, and the annular recess may be provided in the first projections of the output shaft in the circumferential direction.

As a snap ring is fit into the annular recess, the hinge rod may be firmly mounted to the output shaft.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
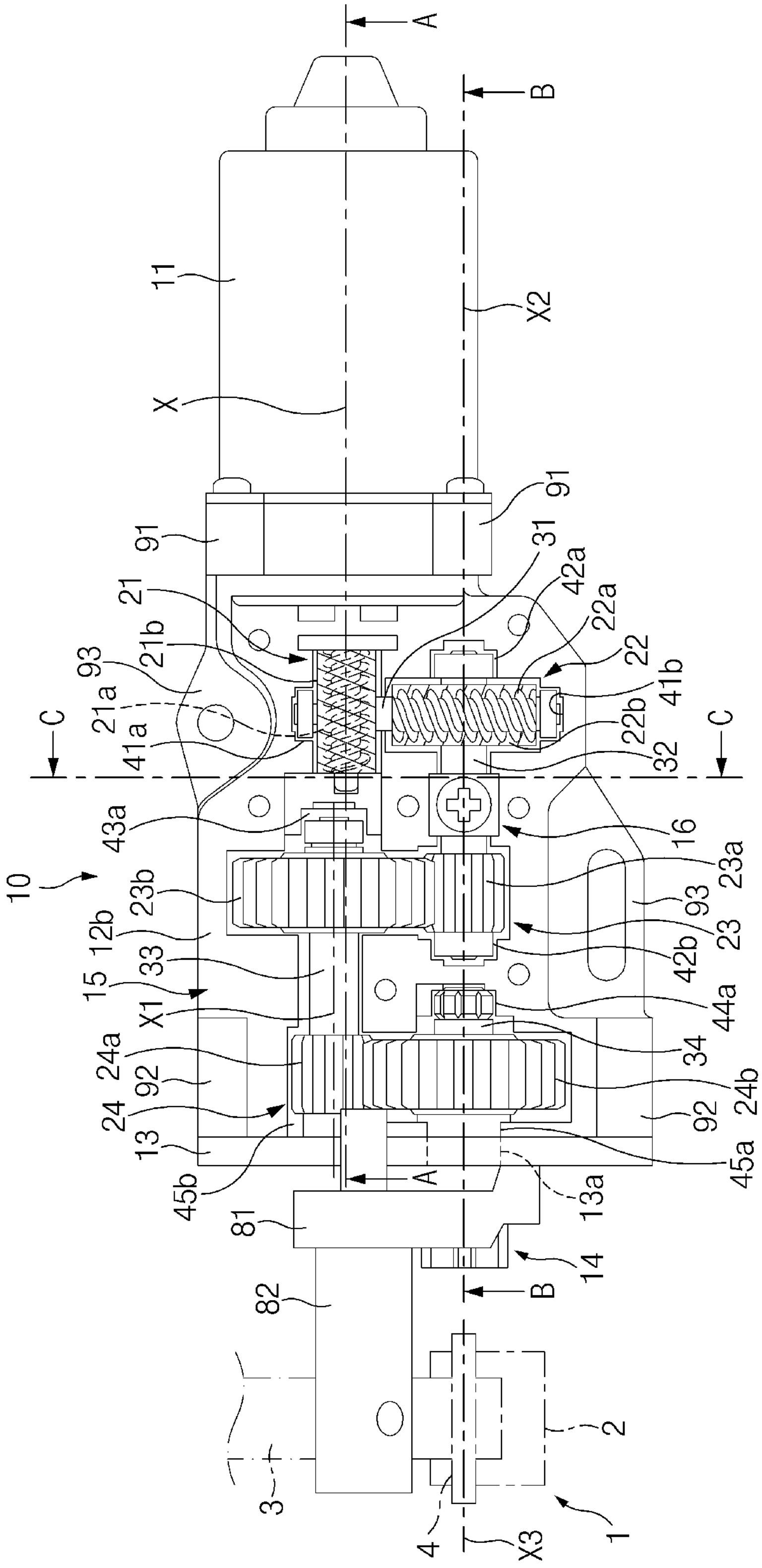
FIG. 1 illustrates a vehicle hinge driving apparatus according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle hinge driving apparatus 10 according to an exemplary embodiment of the present disclosure may be directly connected to a vehicle hinge 1 to drive the vehicle hinge 1. The vehicle hinge 1 may include a hinge bracket 2, and a hinge arm 3 pivotally connected to the hinge bracket 2 through a hinge pin 4. The hinge bracket 2 may be mounted on a portion of a vehicle body adjacent to an opening of the vehicle body through fasteners and/or the like, and the hinge arm 3 may be mounted on a door component through fasteners and/or the like. The hinge arm 3 may pivot (rotate) around an axis X3 of the hinge pin 4.

Referring to FIG. 1, the vehicle hinge driving apparatus 10 according to an exemplary embodiment of the present disclosure may include an actuator 11, a housing 12 connected to the actuator 11, an output shaft 14 rotatably mounted in the housing 12, a transmission mechanism 15 transmitting a torque of the actuator 11 to the output shaft 14, and a brake unit 16 mounted on the transmission mechanism 15.

The actuator 11 may generate a torque, and the actuator 11 may be connected to the vehicle hinge 1 through the transmission mechanism 15 and the output shaft 14. The actuator 11 may be a drive motor. In particular, the actuator 11 may be a bidirectional motor rotatable in both directions.

Figure 2:
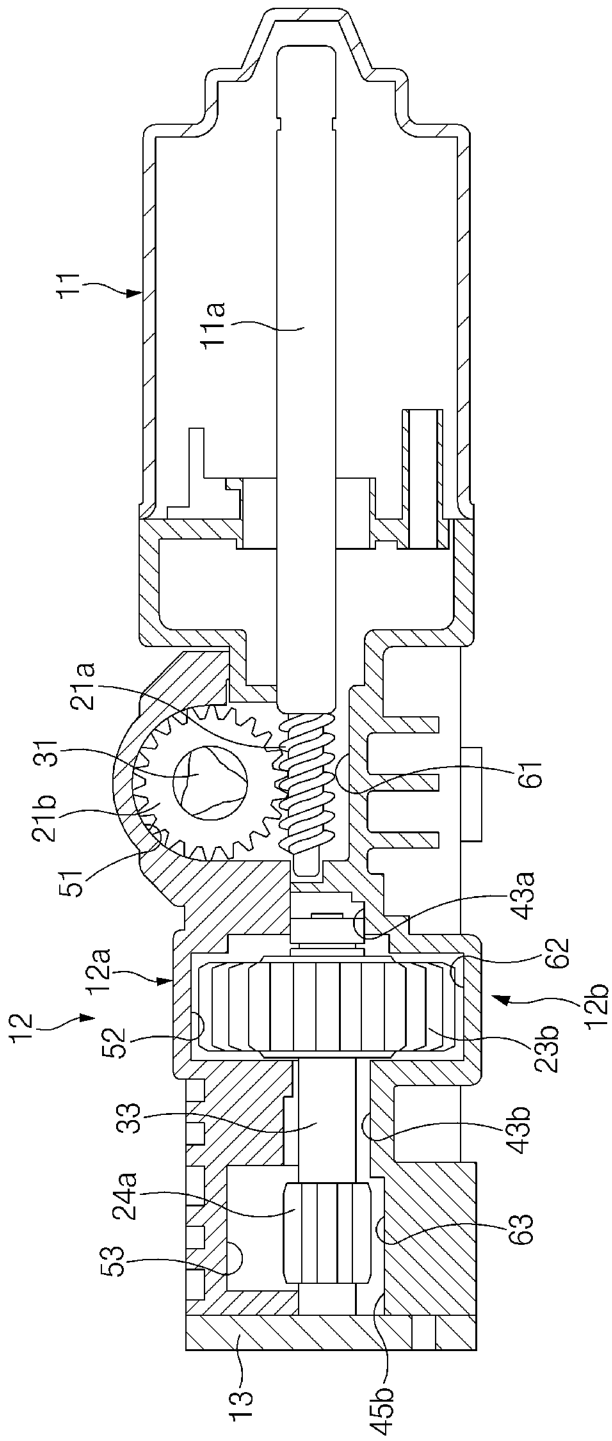
FIG. 2 illustrates a cross-sectional view, taken along line A-A of FIG. 1.

The actuator 11 may include an actuator shaft 11*a* operatively connected to the transmission mechanism 15. The actuator 11 may generate a torque around an axis X of the actuator shaft h a. Referring to FIG. 2, a first proximal drive gear Zia of a first proximal gear set 21 may be fixed to the actuator shaft 11*a* of the actuator 11, and the torque of the actuator 11 may be transmitted to the transmission mechanism 15 through the actuator shaft 11*a* and the first proximal drive gear Zia.

Figure 3:
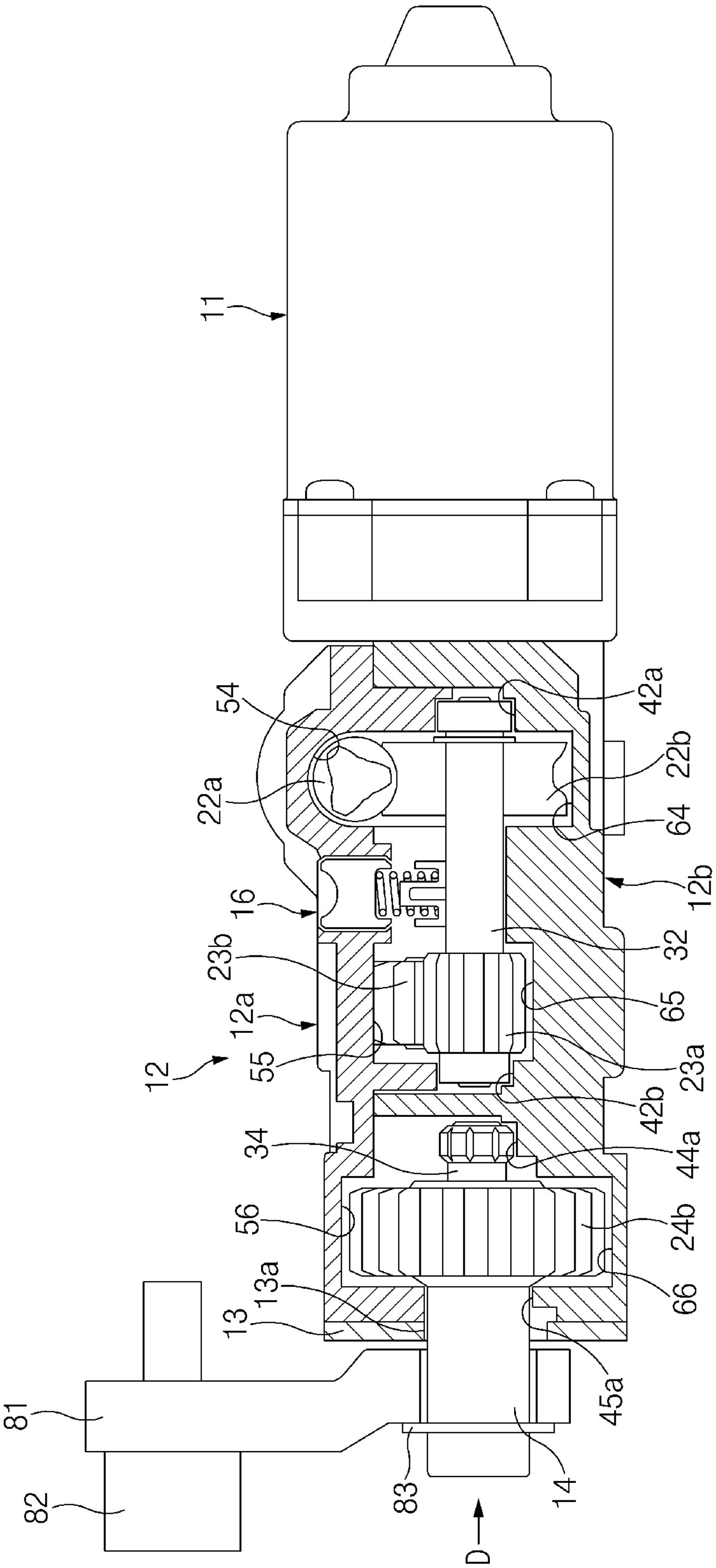
FIG. 3 illustrates a cross-sectional view, taken along line B-B of FIG. 1.
Figure 18:
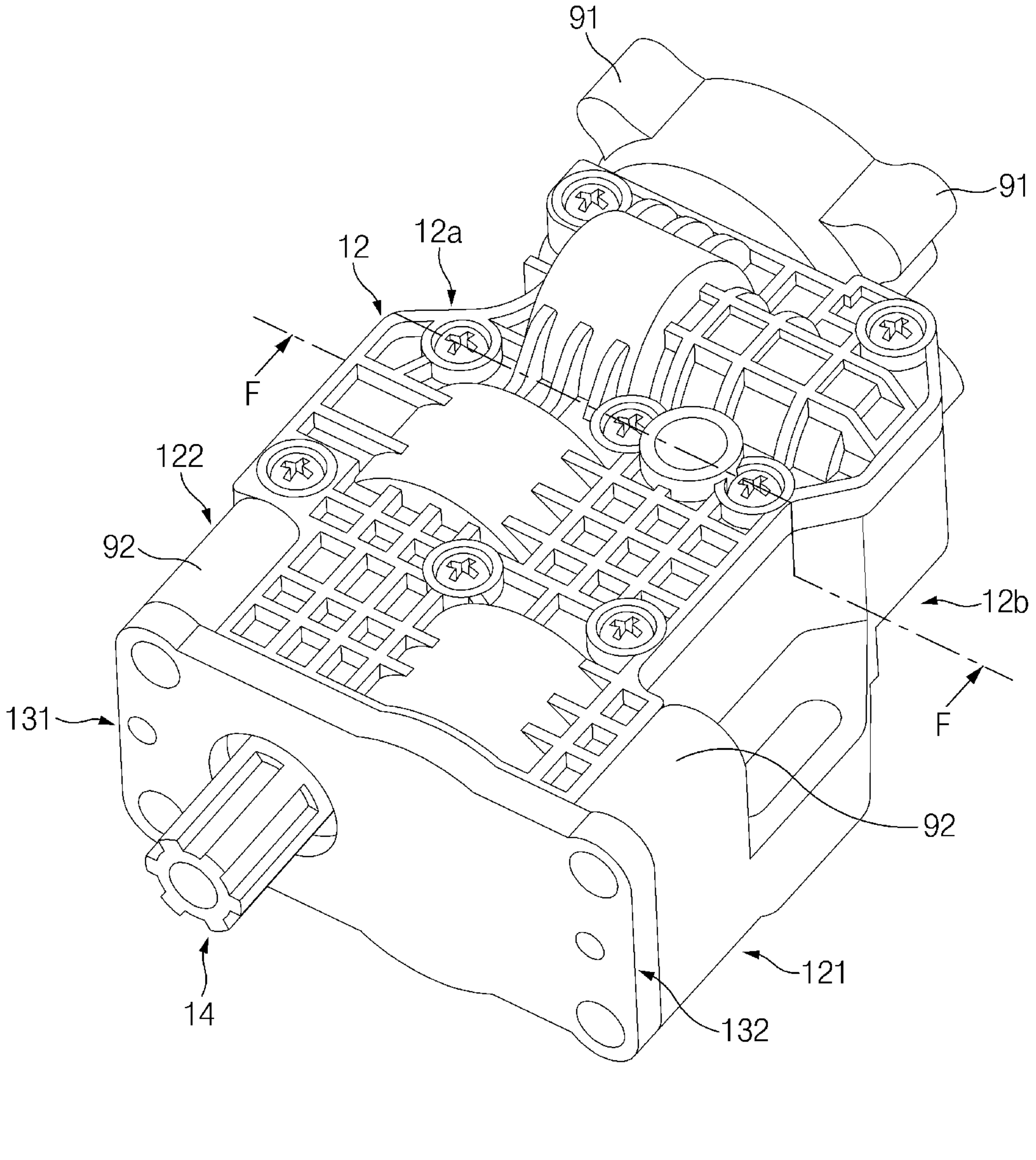
FIG. 18 illustrates a perspective view of the joining of an upper housing and a lower housing in a vehicle hinge driving apparatus according to an exemplary embodiment of the present disclosure.

The housing 12 may receive the transmission mechanism 15 and a portion of the output shaft 14. The housing 12 may have a first mounting end to which the actuator 11 is mounted, and a second mounting end to which a cover 13 is mounted. The first mounting end and the second mounting end may oppose each other in a longitudinal direction of the housing 12. Referring to FIGS. 2 and 3, the housing 12 may include an upper housing 12*a* and a lower housing 12*b*. Referring to FIG. 18, the upper housing 12*a* may be detachably mounted to the lower housing 12*b* through a plurality of fasteners.

Referring to FIGS. 2 and 3, the upper housing 12*a* may include a plurality of upper cavities 51, 52, 53, 54, 55, and 56 in which components of the transmission mechanism 15 are received.

Figure 17:
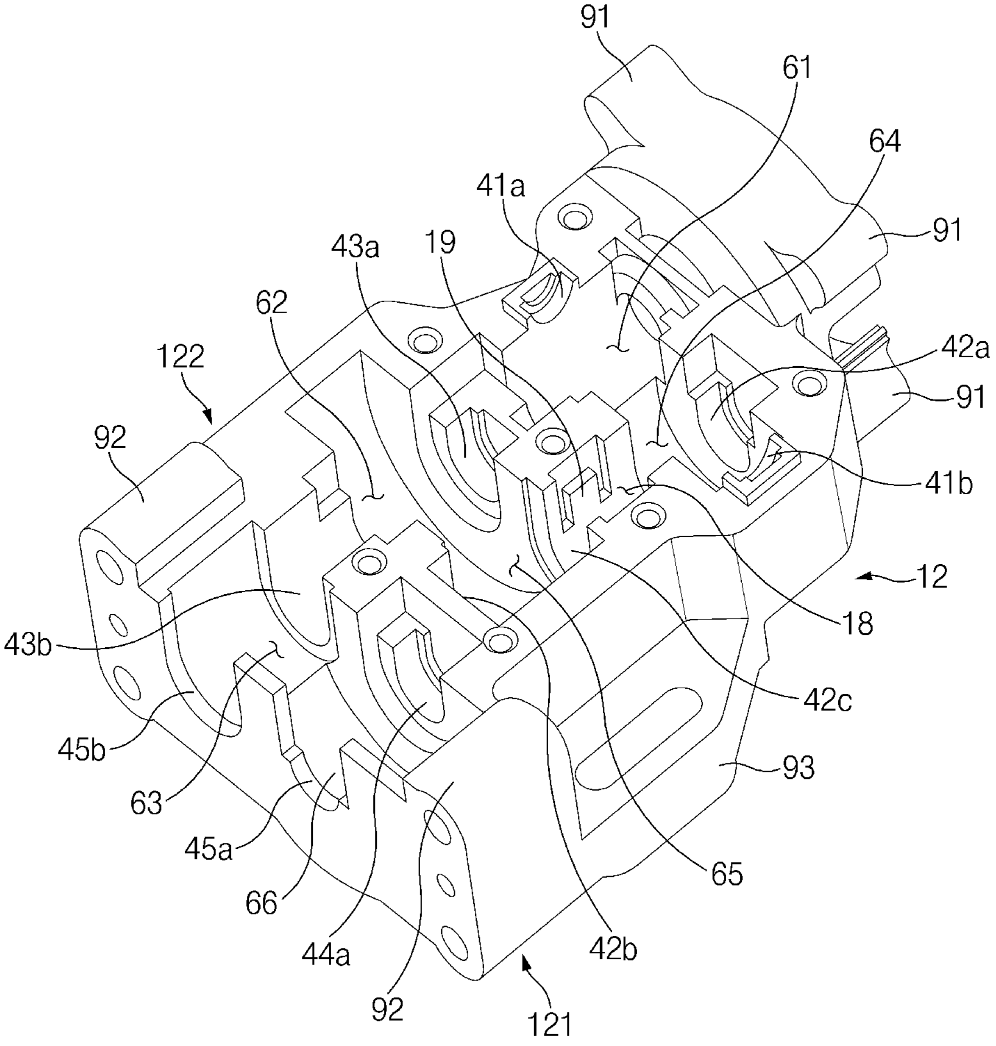
FIG. 17 illustrates a perspective view of a lower housing of a vehicle hinge driving apparatus according to an exemplary embodiment of the present disclosure.

Referring to FIGS. 2, 3, and 17, the lower housing 12*b* may include a plurality of lower cavities 61, 62, 63, 64, 65, and 66 in which components of the transmission mechanism 15 are received. In addition, the lower housing 12*b* may have a first output-side support recess 45*a* and a second output-side support recess 45*b* in which the output shaft 14 is selectively and rotatably supported. The first output-side support recess 45*a* and the second output-side support recess 45*b* may be a semicircular recess corresponding to an outer circumferential surface of the output shaft 14.

The plurality of upper cavities 51, 52, 53, 54, 55, and 56 may correspond to the plurality of lower cavities 61, 62, 63, 64, 65, and 66, respectively, and accordingly the upper cavities and the corresponding lower cavities may receive gear sets to be described below, respectively.

Figure 4:
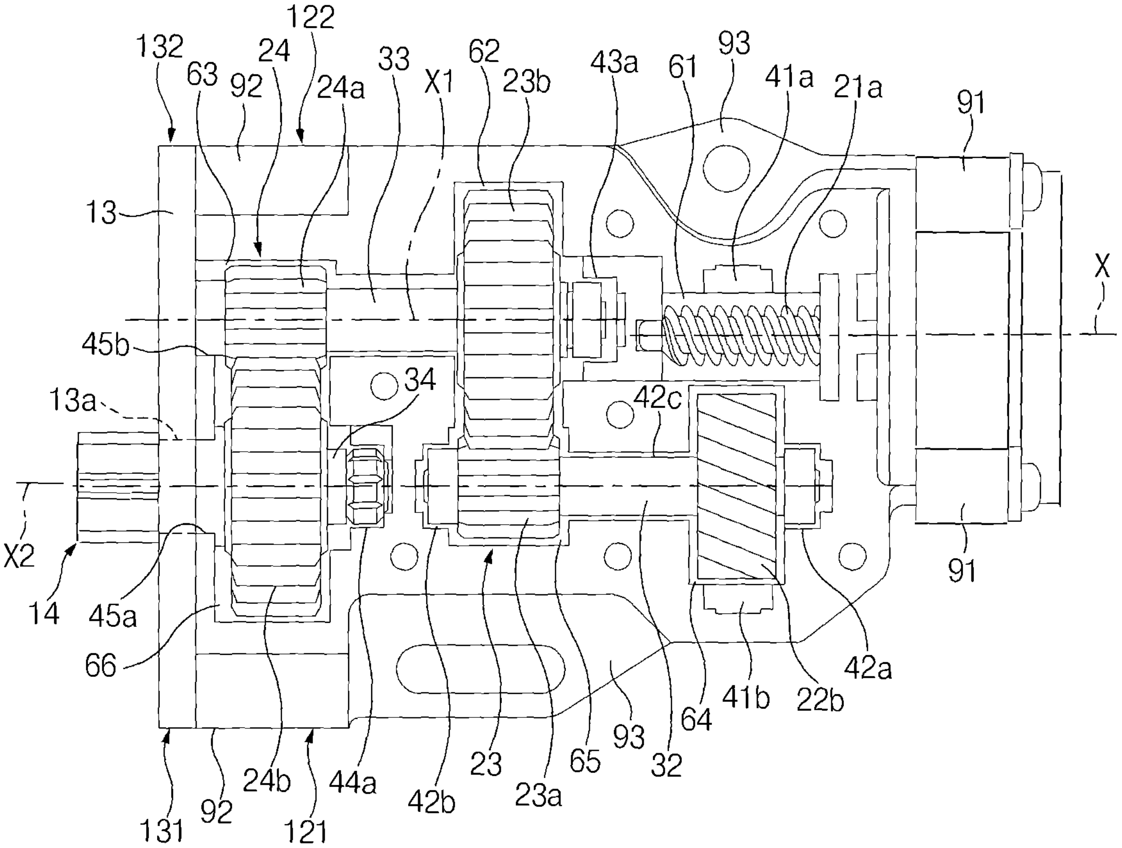
FIG. 4 illustrates a state before a first proximal drive gear of a first proximal gear set and a second proximal drive gear of a second proximal gear set are mounted in a transmission mechanism of the vehicle hinge driving apparatus illustrated in FIG. 1.
Figure 5:
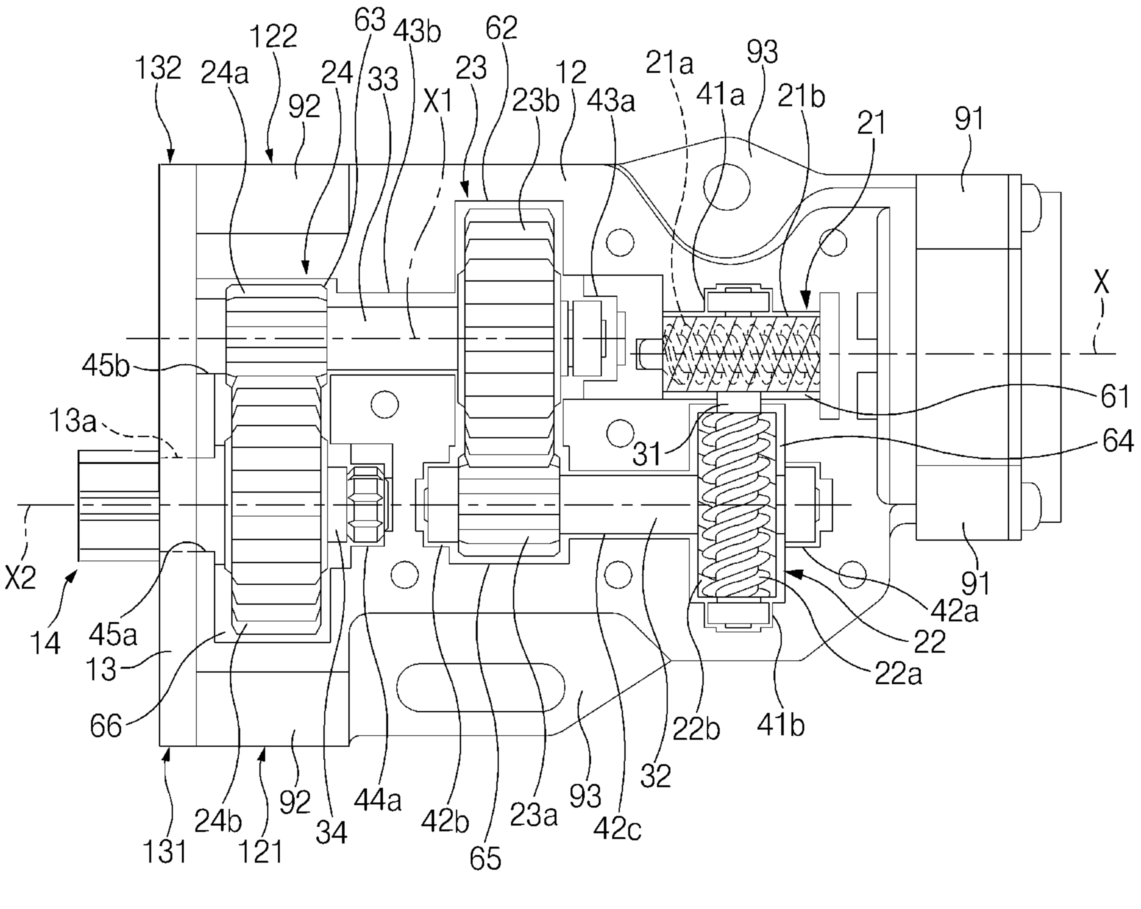
FIG. 5 illustrates a state in which a first proximal drive gear of a first proximal gear set and a second proximal drive gear of a second proximal gear set are mounted in a transmission mechanism of the vehicle hinge driving apparatus illustrated in FIG. 1.

Referring to FIGS. 4 and 5, the housing 12 may include a first side surface 121 and a second side surface 122 opposing each other on both sides thereof. Referring to FIGS. 17 and 18, the first side surface 121 may be on the left side of the housing 12, and the second side surface 122 may be on the right side of the housing 12. The first output-side support recess 45*a* may be adjacent to the first side surface 121, and the second output-side support recess 45*b* may be adjacent to the second side surface 122. The first output-side support recess 45*a* may be closer to the first side surface 121 than the second output-side support recess 45*b*, and the second output-side support recess 45*b* may be closer to the second side surface 122 than the first output-side support recess 45*a*.

Figure 9:
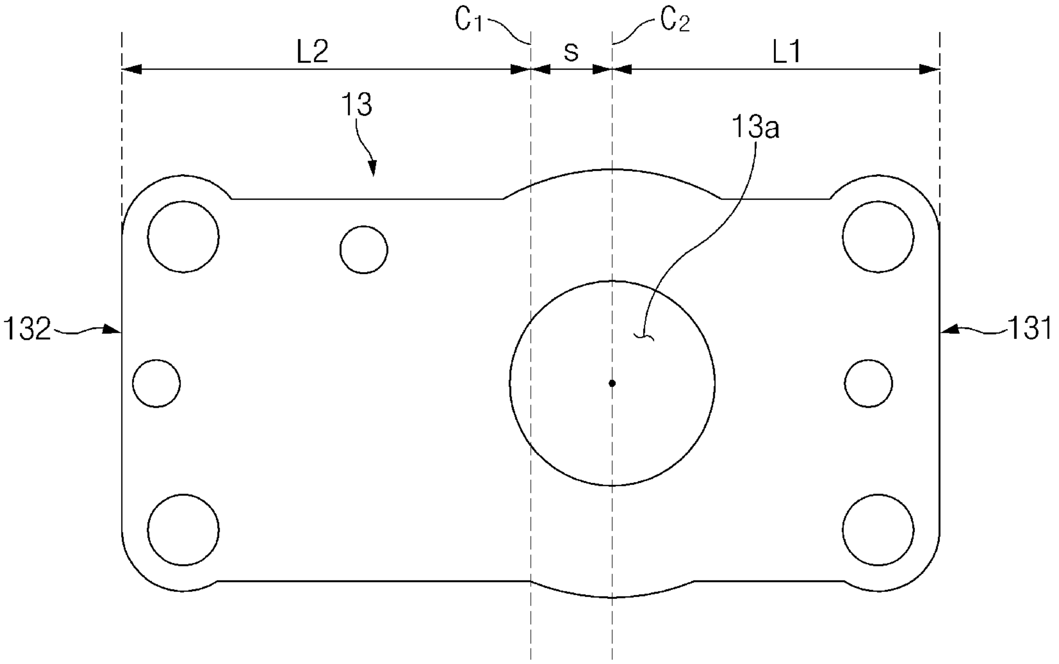
FIG. 9 illustrates a cover of a vehicle hinge driving apparatus according to an exemplary embodiment of the present disclosure.

Referring to FIG. 9, the cover 13 may have a through hole 13*a* through which the output shaft 14 extends, and an outer end portion of the output shaft 14 may protrude from the cover 13 toward the vehicle hinge 1 through the through hole 13*a* of the cover 13. A central vertical axis $C_2$ of the through hole 13*a* may be offset from a central vertical axis $C_1$ of the cover 13. Except for the through hole 13*a*, the exterior of the cover 13 may be symmetrical with respect to the axis $C_1$. To be described below, when the torque of the transmission mechanism 15 is varied, the position of the output shaft 14 may be changed. Accordingly, the cover 13 may be reversed to both left and right sides thereof with respect to the central vertical axis $C_1$ so that the position of the through hole 13*a* of the cover 13 may be changed with respect to the central vertical axis $C_1$ of the cover 13.

Referring to FIGS. 4 and 5, the cover 13 may have a first side surface 131 and a second side surface 132 opposing each other. The through hole 13*a* may be closer to the first side surface 131 than to the second side surface 132. Specifically, a distance L1 between the first side surface 131 and the central vertical axis $C_2$ of the through hole 13*a* may be less than a distance L2 between the second side surface 132 and the central vertical axis $C_2$ of the through hole 13*a*.

Referring to FIG. 1, the housing 12 may include a plurality of first end mounting lugs 91 adjacent to the first mounting end thereof, a plurality of second end mounting lugs 92 adjacent to the second mounting end thereof, and a plurality of side mounting lugs 93 adjacent to the side surfaces thereof.

Referring to FIG. 1, the actuator 11 may be joined to the first end mounting lugs 91 of the housing 12 through fasteners, and the cover 13 may be joined to the second end mounting lugs 92 of the housing 12 through fasteners. The side mounting lugs 93 of the housing 12 may be mounted on the vehicle body or the door component through fasteners.

The output shaft 14 may extend from the transmission mechanism 15 in the housing 12, and the output shaft 14 may extend through the through hole 13*a* of the cover 13. The output shaft 14 may connect the transmission mechanism 15 and the hinge arm 3 of the vehicle hinge 1. Accordingly, the output shaft 14 may transmit the torque received from the transmission mechanism 15 to the vehicle hinge 1.

Referring to FIGS. 1 and 3, a hinge rod 81 may be coupled to the outer end portion of the output shaft 14 through a snap ring 83, and the hinge rod 81 may extend in a direction perpendicular to an axis of the output shaft 14. A hinge adapter 82 may be fixed to the hinge rod 81, and the hinge adapter 82 may extend in a direction perpendicular to an axis of the hinge rod 81. The hinge adapter 82 may be joined to the hinge arm 3 of the vehicle hinge 1 through fasteners and/or the like.

Figure 8:
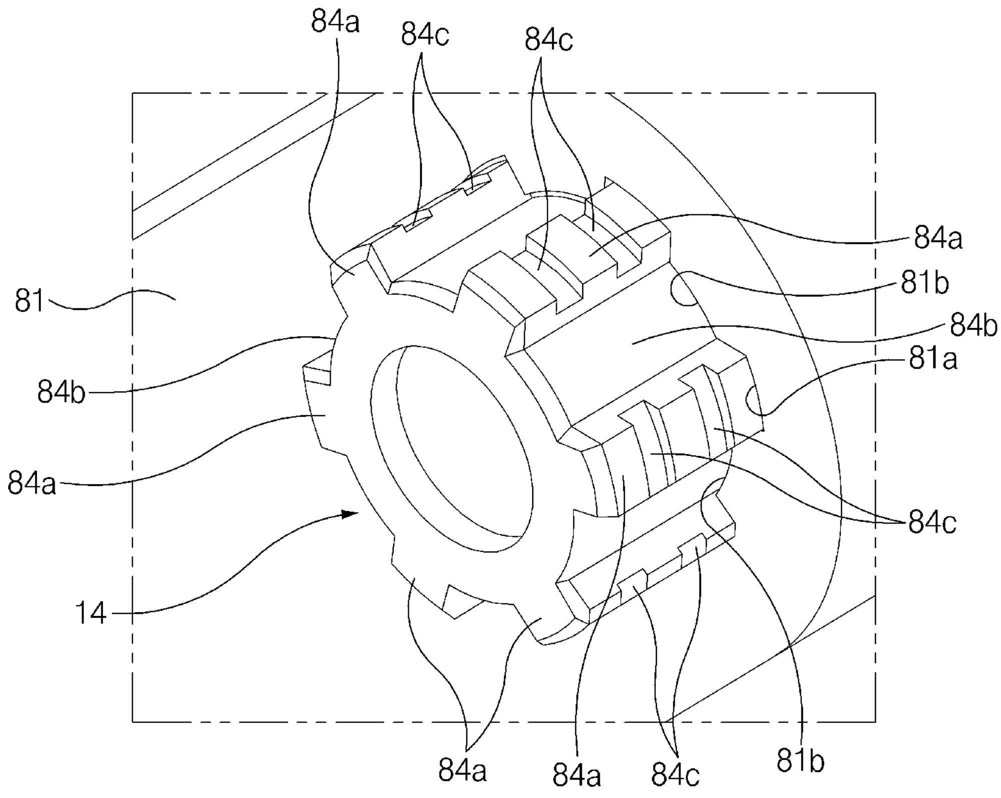
FIG. 8 illustrates a partial perspective view of a state in which an output shaft is coupled to a hinge rod in a vehicle hinge driving apparatus according to an exemplary embodiment of the present disclosure.

Referring to FIG. 8, the output shaft 14 may include a plurality of first projections 84*a* and a plurality of first recesses 84*b* alternately arranged in a circumferential direction thereof, and each first projection 84*a* and each first recess 84*b* may extend in a longitudinal direction of the output shaft 4. The output shaft 14 may extend through the cover 13, and the outer end portion of the output shaft 14 may protrude from the cover 13. The hinge rod 81 may have a through hole through which the end portion of the output shaft 14 extends, and the hinge rod 81 may include a plurality of second recesses 81*a* and a plurality of second projections 81*b* alternately arranged on an inner circumferential surface of the through hole in a circumferential direction thereof. The first projections 84*a* of the output shaft 14 may be fitted into the second recesses 81*a* of the hinge rod 81, respectively, and the second projections 81*b* of the hinge rod 81 may be fitted into the first recesses 84*b* of the output shaft 14, respectively. As the hinge rod 81 and the output shaft 14 are coupled by serration coupling, the output shaft 14 may be prevented from slipping in the through hole of the hinge rod 81 in a rotation direction.

Figure 7:
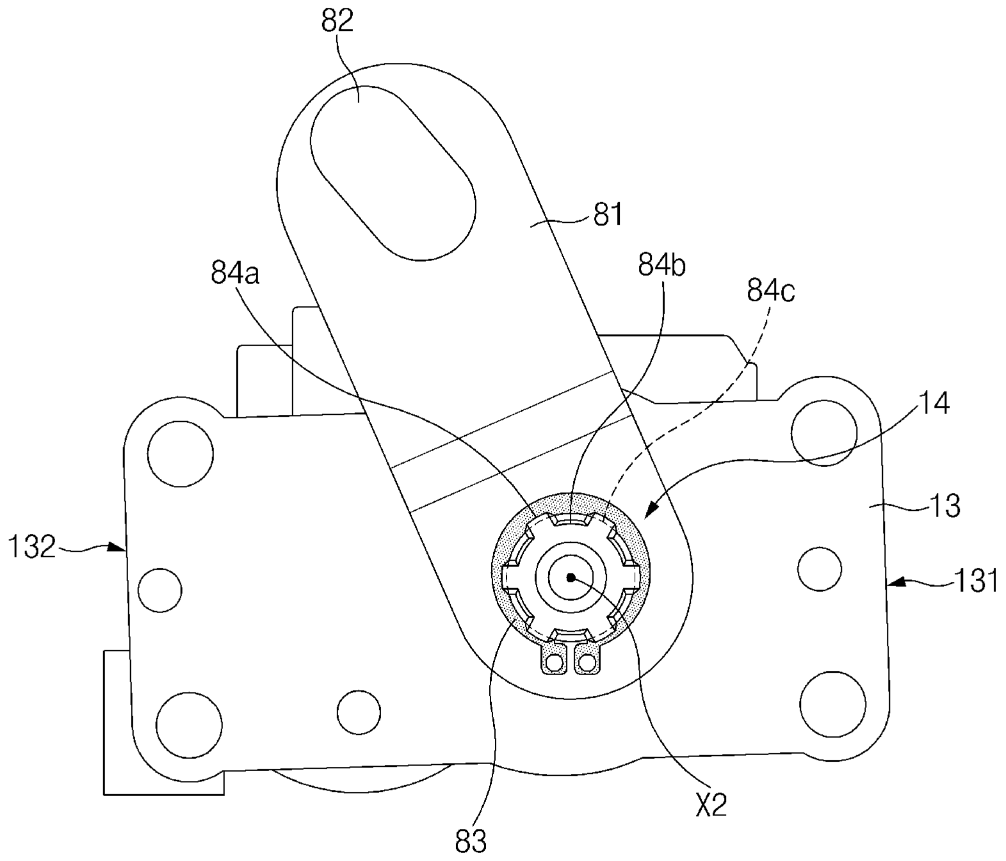
FIG. 7 illustrates a view, which is viewed in a direction indicated by arrow D of FIG. 3.

Referring to FIG. 8, the output shaft 14 may include a plurality of annular recesses 84*c* extending in the circumferential direction thereof. The annular recesses 84*c* may be formed in the first projections 84*a*, and the plurality of annular recesses 84*c* may be spaced apart from each other in an axial direction of the output shaft 14. Referring to FIG. 7, the snap ring 83 may be coupled to any one of the plurality of annular recesses 84*c* so that the hinge rod 81 may be fixedly mounted to the output shaft 14.

According to the exemplary embodiment illustrated in FIGS. 1 to 5, the transmission mechanism 15 may include a plurality of gear sets 21, 22, 23, and 24 by which the actuator 11 and the output shaft 14 are operatively connected, and a plurality of transmission shafts 31, 32, 33, and 34 by which the adjacent gear sets 21, 22, 23, and 24 are connected.

The plurality of gear sets 21, 22, 23, and 24 may include one or more proximal gear sets 21 and 22 close to the actuator 11, and one or more distal gear sets 23 and 24 far from the actuator 11.

Specifically, the plurality of gear sets 21, 22, 23, and 24 may include the first proximal gear set 21 operatively connected to the actuator shaft 11*a* of the actuator 11, a second proximal gear set 22 operatively connected to the first proximal gear set 21, a first distal gear set 23 operatively connected to the second proximal gear set 22, and a second distal gear set 24 operatively connected to the first distal gear set 23.

The first proximal gear set 21 may include the first proximal drive gear Zia fixed to the actuator shaft h a, and a first proximal driven gear 21*b* meshing with the first proximal drive gear Zia. The first proximal driven gear 21*b* is rotated by the first proximal gear Zia. The first proximal gear set 21 may have a predetermined first gear ratio (e.g., 5.5:1). Referring to FIGS. 2 and 4, an axis of the first proximal drive gear Zia may be aligned with the axis X of the actuator shaft h a. The first proximal drive gear Zia may be a worm, and the first proximal driven gear 21*b* may be a worm wheel, and accordingly the first proximal gear set 21 may be a worm drive. An axis of the first proximal driven gear 21*b* may be perpendicular to the axis of the first proximal drive gear Zia. Referring to FIG. 2, at least a portion of the first proximal drive gear Zia may be received in a cavity 61 of the lower housing 12*b*, and at least a portion of the first proximal driven gear 21*b* may be received in a cavity 51 of the upper housing 12*a*.

The second proximal gear set 22 may include a second proximal drive gear 22*a* connected to the first proximal driven gear 21*b* through a first transmission shaft 31, and a second proximal driven gear 22*b* meshing with the second proximal drive gear 22*a*. The second proximal driven gear 22*b* is rotated by the second proximal drive gear Zia. The second proximal gear set 22 may have a predetermined second gear ratio (e.g., 8:1). The second proximal drive gear 22*a* may be a worm, and the second proximal driven gear 22*b* may be a worm wheel, and accordingly the second proximal gear set 22 may be a worm drive. An axis of the second proximal drive gear 22*a* may be aligned with an axis of the first transmission shaft 31, and an axis of the second proximal driven gear 22*b* may be perpendicular to the axis of the second proximal drive gear 22*a* and the axis of the first transmission shaft 31. The first proximal driven gear 21*b* and the second proximal drive gear 22*a* may be fixed to the first transmission shaft 31. The first transmission shaft 31 may include a first end portion adjacent to the actuator 11 and a second end portion relatively far from the actuator 11. The first proximal driven gear 21*b* may be fixed to a portion of the first transmission shaft 31 adjacent to the first end portion of the first transmission shaft 31, and the second proximal drive gear 22*a* may be fixed to a portion of the first transmission shaft 31 adjacent to the second end portion of the first transmission shaft 31. The lower housing 12*b* may have two first lower support recesses 41*a* and 41*b* supporting both end portions of the first transmission shaft 31. The axis of the first transmission shaft 31 may be perpendicular to the axis of the actuator shaft h a. The end portions of the first transmission shaft 31 may be rotatably mounted in the corresponding first lower support recesses 41*a* and 41*b*, respectively, and the end portions of the first transmission shaft 31 may be rotatably supported in the corresponding first lower support recesses 41*a* and 41*b* through bushing, bearing, and/or the like. Referring to FIG. 3, the second proximal drive gear 22*a* may be received in a cavity 54 of the upper housing 12*a*, and the second proximal driven gear 22*b* may be received in a cavity 64 of the lower housing 12*b*.

The first distal gear set 23 may include a first distal drive gear 23*a* connected to the second proximal driven gear 22*b* through a second transmission shaft 32, and a first distal driven gear 23*b* meshing with the first distal drive gear 23*a*. The first distal driven gear 23*b* is rotated by the first distal drive gear 23*a*. The first distal gear set 23 may have a predetermined third gear ratio (e.g., 5:1). The first distal drive gear 23*a* may be a spur gear, and the first distal driven gear 23*b* may be a spur gear having an outer diameter greater than that of the first distal drive gear 23*a*. An axis of the second transmission shaft 32 may be parallel to the axis of the first transmission shaft 31, and the axis of the second transmission shaft 32 may be offset with respect to the axis of the first transmission shaft 31. An axis of the first distal drive gear 23*a* may be aligned with the axis of the second transmission shaft 32. The second transmission shaft 32 may include a first end portion adjacent to the actuator 11 and a second end portion relatively far from the actuator 11. The lower housing 12*b* may have two second lower support recesses 42*a* and 42*b* supporting both end portions of the second transmission shaft 32. The second proximal driven gear 22*b* may be fixed to a portion of the second transmission shaft 32 adjacent to the first end portion of the second transmission shaft 32, and the first distal drive gear 23*a* may be fixed to a portion of the second transmission shaft 32 adjacent to the second end portion of the second transmission shaft 32. The end portions of the second transmission shaft 32 may be rotatably mounted in the corresponding second lower support recesses 42*a* and 42*b*, respectively, and the end portions of the second transmission shaft 32 may be rotatably supported in the corresponding second lower support recesses 42*a* and 42*b* through bushing, bearing, and/or the like. A recess 42*c* may be provided to receive a central portion of the second transmission shaft 32 between the two second lower support recesses 42*a* and 42*b*. Referring to FIG. 3, the first distal drive gear 23*a* may be received in a cavity 65 of the lower housing 12*b*. Referring to FIG. 2, the first distal driven gear 23*b* may be received in a cavity 52 of the upper housing 12*a* and a cavity 62 of the lower housing 12*b*.

The second distal gear set 24 may include a second distal drive gear 24*a* connected to the first distal driven gear 23*b* through a third transmission shaft 33, and a second distal driven gear 24*b* meshing with the second distal drive gear 24*a*. The second distal driven gear 24*b* is rotated by the second distal drive gear 24*a*. The second distal gear set 24 may have a predetermined fourth gear ratio (e.g., 3:1). The second distal drive gear 24*a* may be a spur gear, and the second distal driven gear 24*b* may be a spur gear having an outer diameter greater than that of the second distal drive gear 24*a*.

According to an exemplary embodiment, an axis X1 of the third transmission shaft 33 may be parallel to the axis of the second transmission shaft 32, the axis X1 of the third transmission shaft 33 may be offset with respect to the axis of the second transmission shaft 32, and the axis X1 of the third transmission shaft 33 may be offset with respect to the axis X of the actuator shaft h a. According to another exemplary embodiment, the axis X1 of the third transmission shaft 33 may be aligned with the axis X of the actuator shaft h a.

An axis of the second distal drive gear 24*a* may be aligned with the axis X1 of the third transmission shaft 33. The third transmission shaft 33 may include a first end portion adjacent to the actuator 11 and a second end portion relatively far from the actuator 11. The lower housing 12*b* may have a third lower support recess 43*a* rotatably supporting the first end portion of the third transmission shaft 33, and the first end portion of the third transmission shaft 33 may be rotatably supported in the third lower support recess 43*a* through bushing, bearing, and/or the like. The second output-side support recess 45*b* may be located opposite the third lower support recess 43*a*, and the second end portion of the third transmission shaft 33 may be rotatably supported in the second output-side support recess 45*b* through bushing, bearing, and/or the like. The first distal driven gear 23*b* may be fixed to a portion of the third transmission shaft 33 adjacent to the first end portion of the third transmission shaft 33, and the second distal drive gear 24*a* may be fixed to a portion of the third transmission shaft 33 adjacent to the second end portion of the third transmission shaft 33. The second distal driven gear 24*b* may be fixed to a fourth transmission shaft 34. The lower housing 12*b* may have a fourth lower support recess 44*a* rotatably supporting the fourth transmission shaft 34, and the fourth transmission shaft 34 may be rotatably supported in the fourth lower support recess 44*a* through bushing, bearing, and/or the like. An axis X2 of the fourth transmission shaft 34 may be aligned with the axis of the second transmission shaft 32. Referring to FIG. 2, the second distal drive gear 24*a* may be received in a cavity 53 of the upper housing 12*a* and a cavity 63 of the lower housing 12*b*. Referring to FIG. 3, the second distal driven gear 24*b* may be received in a cavity 56 of the upper housing 12*a* and a cavity 66 of the lower housing 12*b*.

The output shaft 14 may be connected to the second distal driven gear 24*b*, and the output shaft 14 may be located opposite the fourth transmission shaft 34. That is, the output shaft 14 and the fourth transmission shaft 34 may face each other with the second distal driven gear 24*b* interposed therebetween. The axis of the output shaft 14 may be aligned with an axis of the second distal driven gear 24*b* and the axis X2 of the fourth transmission shaft 34. The first output-side support recess 45*a* may be located opposite the fourth lower support recess 44*a*, and the output shaft 14 may be received in the first output-side support recess 45*a*. The output shaft 14 may be rotatably supported in the first output-side support recess 45*a* through bushing, bearing, and/or the like. Referring to FIGS. 4 and 5, the axis of the through hole 13*a* of the cover 13 may be aligned with the axis X2 of the fourth transmission shaft 34, and the axis of the output shaft 14 may be aligned with the axis X2 of the fourth transmission shaft 34. The output shaft 14 may be rotatably received in the first output-side support recess 45*a*. The first side surface 131 of the cover 13 may be aligned with the first side surface 121 of the housing 12, and the second side surface 132 of the cover 13 may be aligned with the second side surface 122 of the housing 12. Accordingly, the output shaft 14 may be located on the right side of the cover 13 as illustrated in FIG. 7.

As the actuator 11 drives, the first proximal drive gear 21*a* may rotate, and the first proximal driven gear 21*b* may be rotated by the first proximal drive gear 21*a*. For example, the first gear ratio of the first proximal gear set 21 may be 5.5:1. The torque from the actuator 11 may increase based on the first gear ratio of the first proximal gear set 21 and be transmitted to the second proximal gear set 22.

As the torque is transmitted from the first proximal gear set 21 to the second proximal gear set 22 through the first transmission shaft 31, the second proximal drive gear 22*a* of the second proximal gear set 22 may rotate, and accordingly the second proximal driven gear 22*b* may be rotated. For example, the second gear ratio of the second proximal gear set 22 may be 8:1. The torque from the first proximal gear set 21 may increase based on the second gear ratio of the second proximal gear set 22 and be transmitted to the first distal gear set 23.

As the torque is transmitted from the second proximal gear set 22 to the first distal gear set 23 through the second transmission shaft 32, the first distal drive gear 23*a* of the first distal gear set 23 may rotate, and accordingly the first distal driven gear 23*b* may be rotated. For example, the third gear ratio of the first distal gear set 23 may be 5:1. The torque from the second proximal gear set 22 may increase based on the third gear ratio of the first distal gear set 23 and be transmitted to the second distal gear set 24.

As the torque is transmitted from the first distal gear set 23 to the second distal gear set 24 through the third transmission shaft 33, the second distal drive gear 24*a* of the second distal gear set 24 may rotate, and accordingly the second distal driven gear 24*b* may be rotated. For example, the fourth gear ratio of the second distal gear set 24 may be 3:1. The torque from the first distal gear set 23 may increase based on the fourth gear ratio of the second distal gear set 24 and be transmitted to the output shaft 14.

Figure 10:
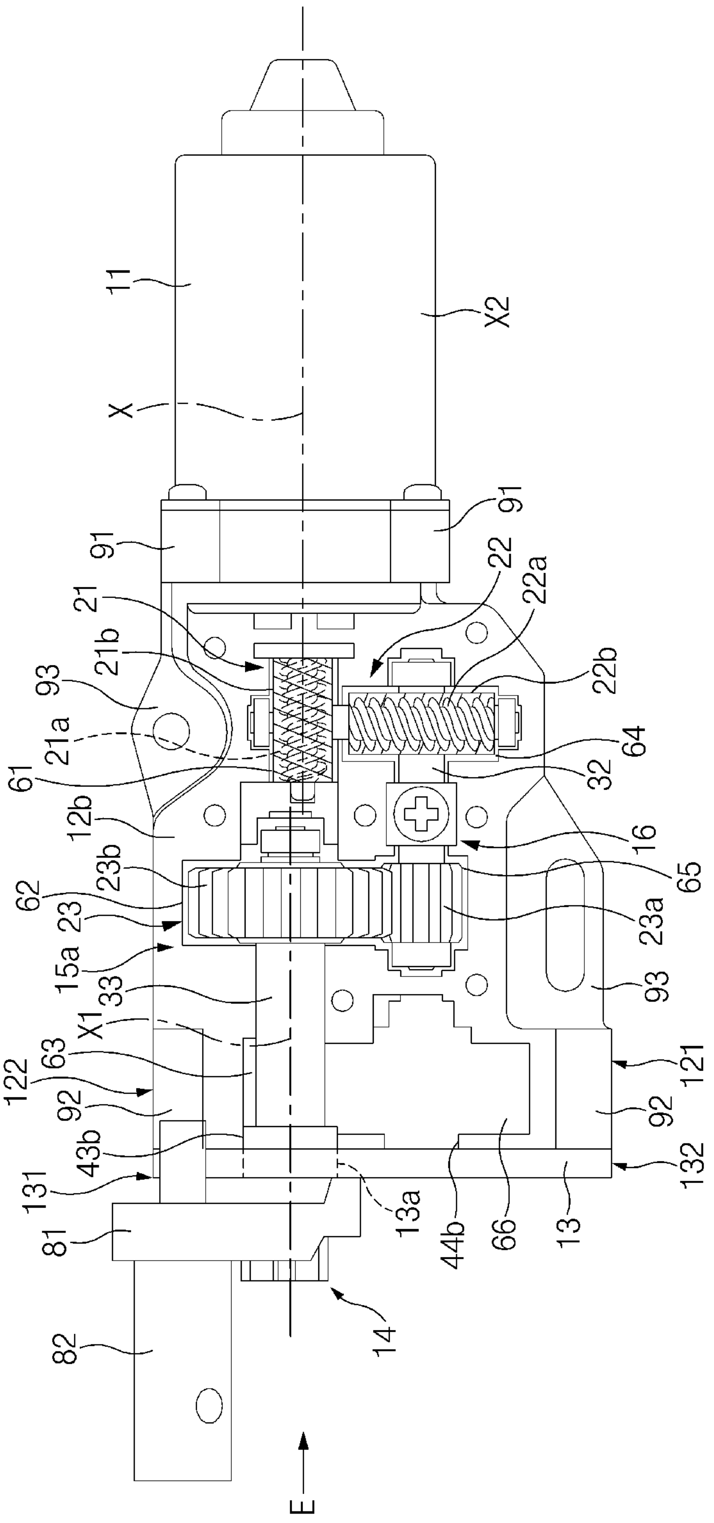
FIG. 10 illustrates a vehicle hinge driving apparatus according to another exemplary embodiment of the present disclosure.
Figure 11:
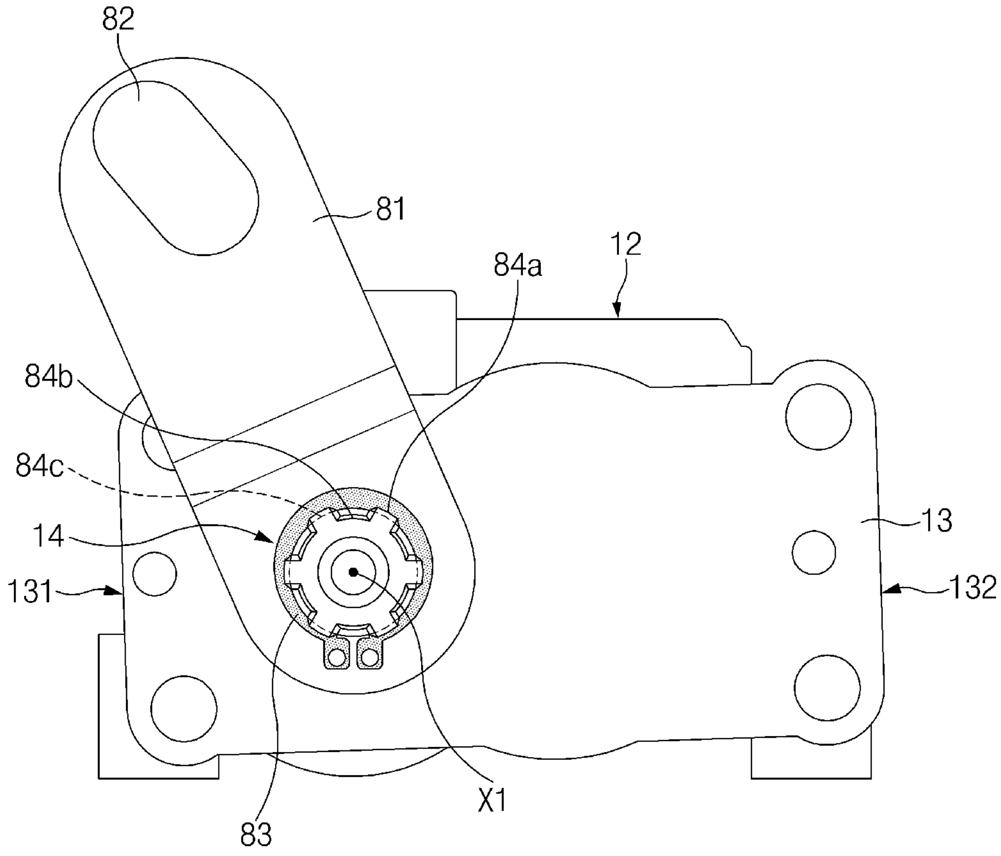
FIG. 11 illustrates a view, which is viewed in a direction indicated by arrow E of FIG. 10.

FIG. 10 illustrates a transmission mechanism 15*a* of a vehicle hinge driving apparatus according to another exemplary embodiment of the present disclosure. Referring to FIG. 10, in the vehicle hinge driving apparatus according to another exemplary embodiment, the second distal gear set 24 may be detached from the transmission mechanism 15*a*, and the cover 13 in the state of FIG. 5 may be reversed to the left and right (180°) with respect to the central vertical axis $C_1$ of the cover 13 so that the first side surface 131 of the cover 13 may be aligned with the second side surface 122 of the housing 12 and the second side surface 132 of the cover 13 may be aligned with the first side surface 121 of the housing 12. Accordingly, the through hole 13*a* of the cover 13 may be located in the opposite position. The through hole 13*a* of the cover 13 may be aligned with the axis X1 of the third transmission shaft 33, and the output shaft 14 may be connected to the first distal driven gear 23*b* of the first distal gear set 23 so that the axis of the output shaft 14 may be aligned with the axis X1 of the third transmission shaft 33. Accordingly, the output shaft 14 may be located on the left side of the cover 13 as illustrated in FIG. 11.

Since the second distal gear set 24 is detached from the transmission mechanism 15*a* in the exemplary embodiment illustrated in FIG. 10, the transmission mechanism 15*a* may be able to transmit a relatively reduced output torque compared to the transmission mechanism 15 according to the exemplary embodiment illustrated in FIGS. 1 to 5. For example, an output torque of approximately 95 N·m may be required to drive a relatively heavy door component (e.g., 15 kg or more) such as a trunk lid or a door of a medium/large sized vehicle, and the transmission mechanism 15 according to the exemplary embodiment illustrated in FIGS. 1 to 5 may be able to transmit a relatively high output torque (maximum 95 N·m) to the output shaft 14 through the four gear sets 21, 22, 23, and 24. Meanwhile, an output torque of approximately 32 N·m may be required to drive a relatively light door component (e.g., less than 15 kg) such as a trunk lid or a door of a small sized vehicle, and the transmission mechanism 15*a* according to the exemplary embodiment illustrated in FIG. 10 may be able to transmit a relatively low output torque (maximum 32 N·m) to the output shaft 14 through the three gear sets 21, 22, and 23. That is, as the second distal gear set 24 is detached, the gear ratio may be relatively reduced, and thus the output torque of the output shaft 14 may be varied accordingly.

As illustrated in FIGS. 5 and 10, when a required output torque is varied according to types of vehicles, the position of the output shaft 14 may be reversed to the left and right through the left-right reverse of the cover 13, and thus the number of gear sets of the transmission mechanism 15 or 15*a* may be easily changed.

In a state in which the actuator 11 is stopped, a torque (hereinafter, referred to as "back drive torque") generated due to the weight of the door component itself or other external forces may be transmitted from the output shaft 14 to the actuator 11 through the transmission mechanism 15. When the back drive torque is transmitted to the actuator 11 through the transmission mechanism 15, an overload may be transmitted to a portion of the transmission mechanism 15 and/or the actuator 11. For example, when the actuator 11 stops in a state in which the door component is fully or partially opened, the back drive torque may act on the output shaft 14 due to the weight of the door component itself.

Figure 6:
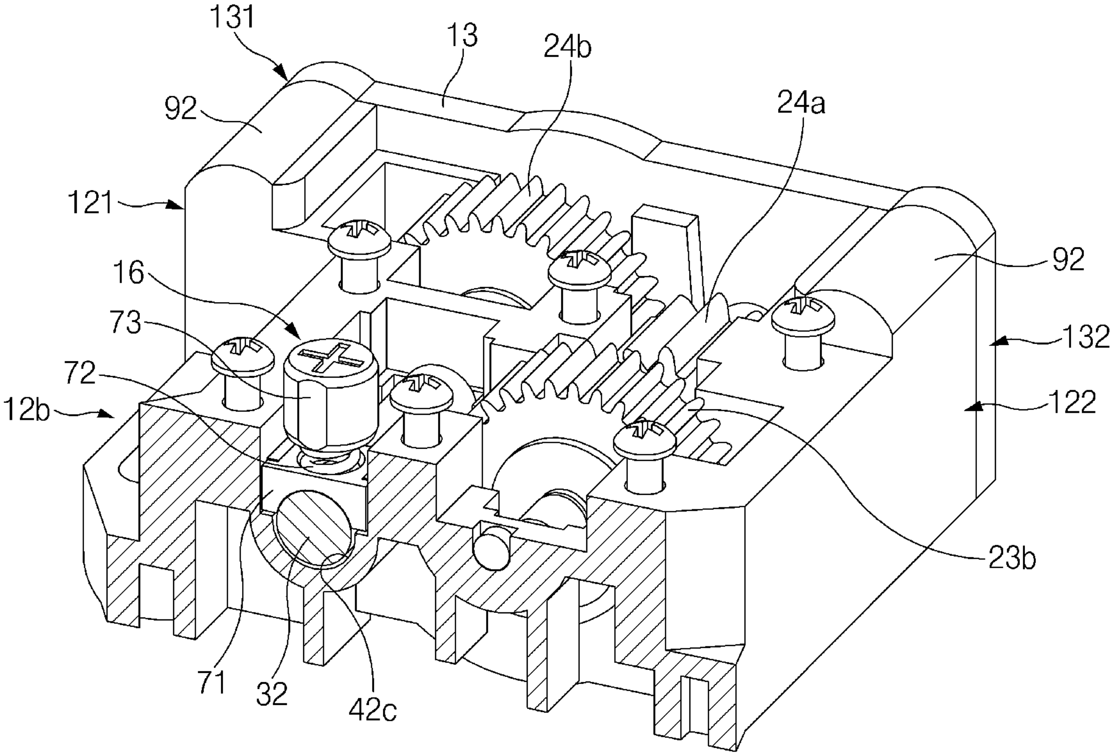
FIG. 6 illustrates a cutaway perspective view, taken along line C-C of FIG. 1.

Referring to FIGS. 1 and 6, the brake unit 16 may be mounted on the transmission mechanism 15, and the brake unit 16 may convert the back drive torque into a brake torque using friction. In particular, as the brake unit 16 directly contacts at least one transmission shaft of the plurality of transmission shafts 31, 32, 33, and 34, a frictional force may be generated between the brake unit 16 and at least one transmission shaft so that the brake torque may be generated. The brake unit 16 may be mounted on at least one transmission shaft of the plurality of transmission shafts 31, 32, 33, and 34 so that each of the gear sets 21, 22, 23, and 24 may be prevented from being damaged by the back drive torque.

Figure 12:
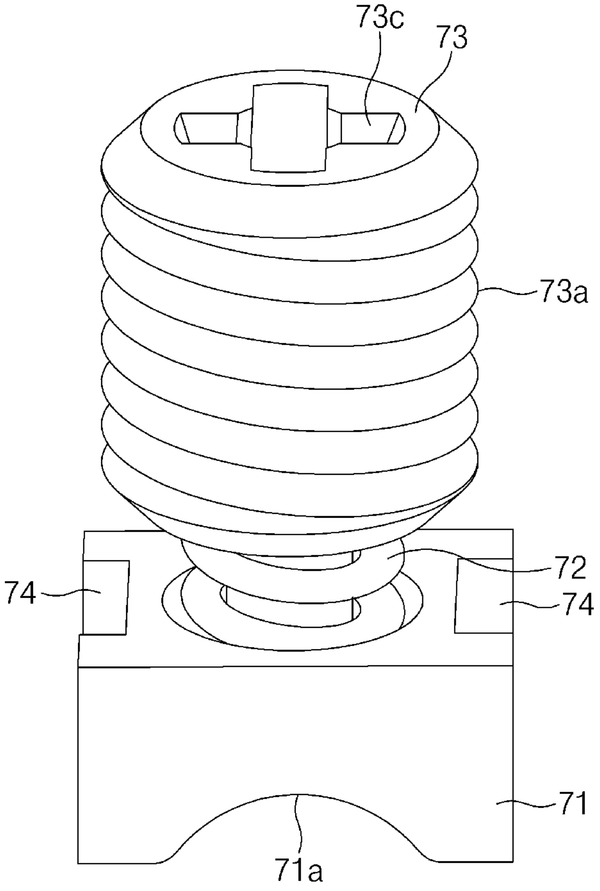
FIG. 12 illustrates a perspective view of a brake unit of a vehicle hinge driving apparatus according to an exemplary embodiment of the present disclosure.
Figure 13:
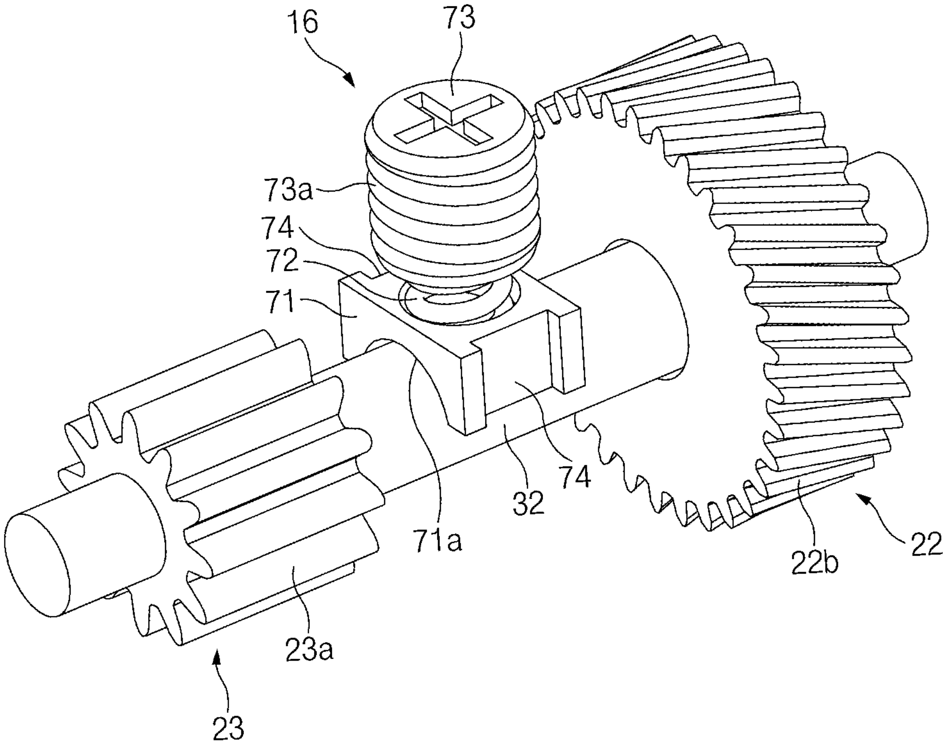
FIG. 13 illustrates a state in which the brake unit illustrated in FIG. 12 is mounted on a second transmission shaft of a transmission mechanism.
Figure 14:
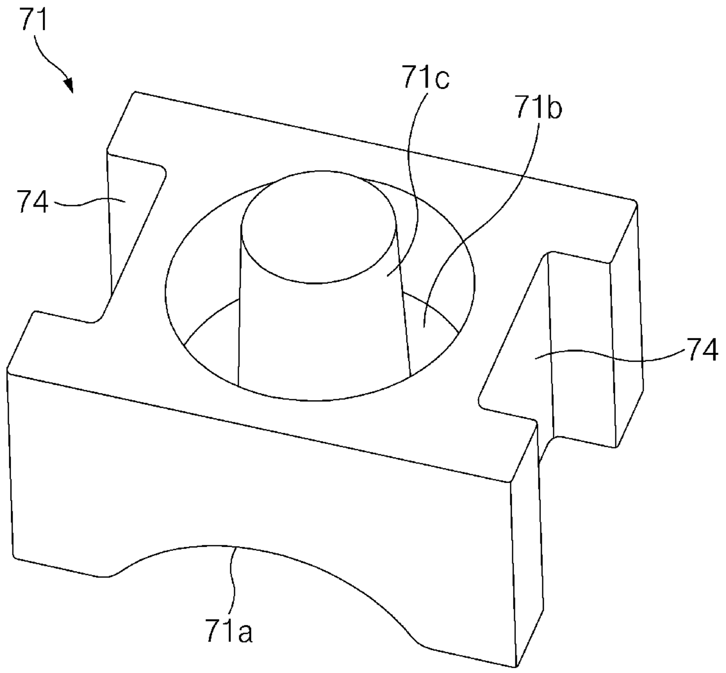
FIG. 14 illustrates a perspective view of a friction member of the brake unit illustrated in FIG. 12.

Referring to FIGS. 12 to 14, the brake unit 16 may include a friction member 71 frictionally contacting the transmission shaft, a spring 72 applying an elastic force to push the friction member 71 toward the transmission shaft, and an adjusting member 73 adjusting spring tension of the spring 72.

According to an exemplary embodiment, the brake unit 16 may be mounted on the second transmission shaft 32 among the plurality of transmission shafts 31, 32, 33, and 34. Accordingly, the brake unit 16 may be disposed between the first distal gear set 23 and the second proximal gear set 22 so that the back drive torque may be converted into the brake torque, and thus the deformation or damage of the second transmission shaft 32 may be prevented, and the back drive torque may be prevented from being transmitted to the actuator 11. That is, the transmission of the back drive torque between the first distal gear set 23 which is a spur gear set and the second proximal gear set 22 which is a worm drive may be blocked so that the first proximal gear set 21 and the second proximal gear set 22 may be prevented from being damaged by the back drive torque, and the transmission of the overload to the actuator 11 may be reliably blocked.

Referring to FIGS. 12 to 15, the friction member 71 may include a friction surface 71*a* directly contacting an outer circumferential surface of the second transmission shaft 32, and the friction surface 71*a* may have an arc shape corresponding to that of the outer circumferential surface of the second transmission shaft 32. The arc shape of the friction surface 71*a* may have the same radius as that of the second transmission shaft 32. Accordingly, the friction surface 71*a* and the second transmission shaft 32 may tightly contact each other. When the back drive torque is transmitted to the second transmission shaft 32 in a state in which the actuator 11 is stopped, the second transmission shaft 32 may be rotated by the back drive torque, and the back drive torque may be converted into the brake torque by the frictional force generated between the friction surface 71*a* and the second transmission shaft 32.

Figure 15:
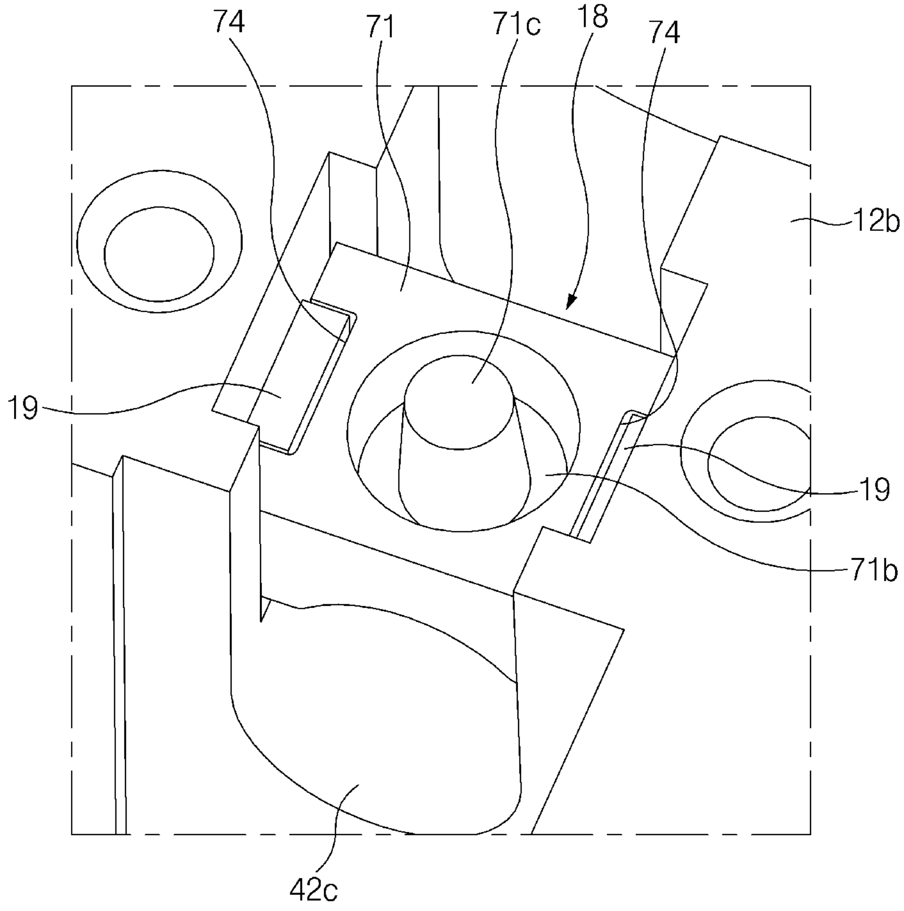
FIG. 15 illustrates a state in which the friction member illustrated in FIG. 14 is mounted in a lower housing.

Referring to FIG. 15, the lower housing 12*b* may include a cavity 18 in which the friction member 71 is received, and two guide projections 19 opposing each other in the cavity 18. Referring to FIG. 14, the friction member 71 may have two guide grooves 74 opposing each other. Referring to FIG. 15, the guide projections 19 may be received in the corresponding guide grooves 74, respectively, and the guide grooves 74 of the friction member 71 may be guided to the guide projections 19 of the lower housing 12*b*, respectively, so that the movement of the friction member 71 may be accurately guided along the cavity 18 of the lower housing 12*b*. Referring to FIGS. 15 and 17, the recess 42*c* in which the central portion of the second transmission shaft 32 is received may be provided in the bottom of the cavity 18.

Figure 16:
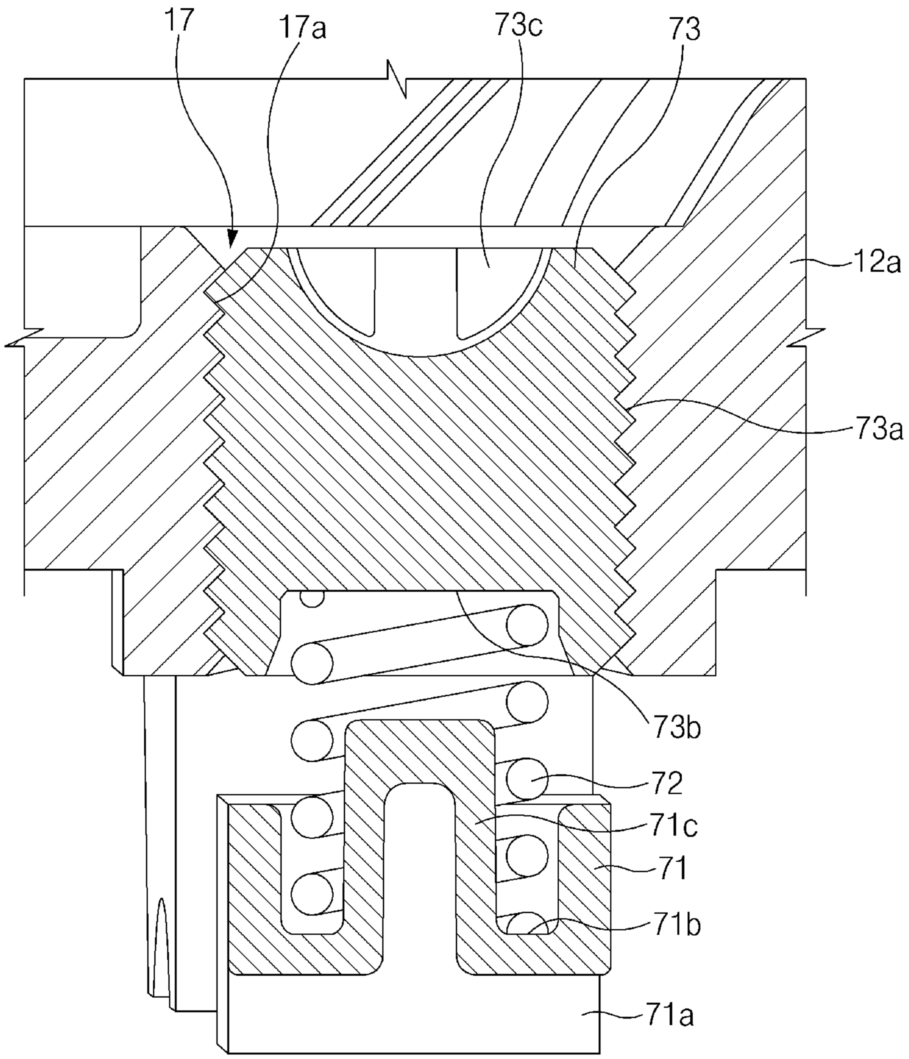
FIG. 16 illustrates a cross-sectional view of a brake unit of a vehicle hinge driving apparatus according to an exemplary embodiment of the present disclosure.

Referring to FIGS. 14 to 16, the friction member 71 may have a retainer recess 71*b* recessed from a top surface thereof to a bottom surface thereof, and a retainer projection 71*c* protruding upwardly from the retainer recess 71*b*.

The spring 72 may apply the spring force to push the friction member 71 toward the second transmission shaft 32. The spring 72 may be interposed between the friction member 71 and the adjusting member 73 so that the spring 72 may be stably supported between the friction member 71 and the adjusting member 73.

Referring to FIG. 16, a mounting boss 17 having a mounting hole may be provided to the upper housing 12*a*, and the adjusting member 73 may be adjustably mounted in the mounting hole of the mounting boss 17. The mounting hole of the mounting boss 17 may have an internal thread 17*a* provided on an inner circumferential surface thereof. An axis of the adjusting member 73 may be aligned with an axis of the mounting hole of the mounting boss 17. Referring to FIG. 12, the adjusting member 73 may have an external thread 73*a* provided on an outer circumferential surface thereof. Referring to FIG. 16, the external thread 73*a* of the adjusting member 73 may mesh with the internal thread 17*a* of the mounting boss 17 of the upper housing 12*a*. The adjusting member 73 may include a driver recess 73*c* provided in a top surface thereof, and a retainer recess 73*b* provided in a bottom surface thereof. A top end of the spring 72 may be supported by the retainer recess 73*b* of the adjusting member 73, and a bottom end of the spring 72 may be supported by the retainer recess 71*b* and the retainer projection 71*c* of the friction member 71.

As the adjusting member 73 is rotated by a driver, the adjusting member 73 may move along an axial direction thereof. As the adjusting member 73 moves along the axis of the mounting hole of the mounting boss 17, the tension of the spring 72 may be adjusted between the retainer recess 73*b* of the adjusting member 73 and the retainer recess 71*b* of the friction member 71.

The brake unit 16 may support the central portion of the second transmission shaft 32, thereby preventing the deformation of the second transmission shaft 32, and effectively suppressing vibration and noise generated during the operation of the actuator 11. In particular, even if the friction surface 71*a* of the friction member 71 is worn as it contacts the second transmission shaft 32, the tension of the spring 72 may be adjusted by the adjusting member 73 so that the friction surface 71*a* of the friction member 71 may continuously maintain uniform friction with the second transmission shaft 32, and accordingly the back drive torque may be stably converted into the brake torque. Thus, the transmission of the back drive torque to the actuator 11 may be blocked or minimized, and the open state of the door component may be stably maintained. Specifically, when the door component is opened, the brake unit 16 may provide the brake torque to the output shaft 14 through the transmission mechanism 15 or 15*a* so that the door component may be prevented from being closed by its own weight.

Figure 19:
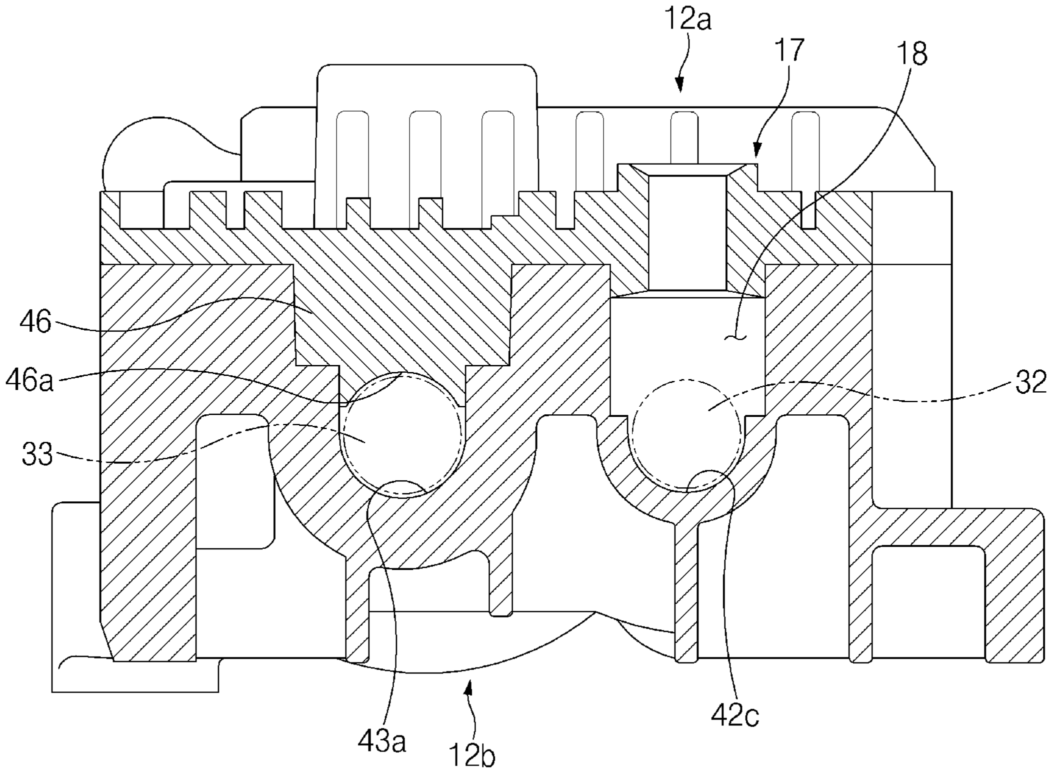
FIG. 19 illustrates a cross-sectional view, taken along line F-F of FIG. 18.

At least one transmission shaft of the plurality of transmission shafts 31, 32, 33, and 34 may be received between an upper support recess of the upper housing 12*a* and a lower support recess of the lower housing 12*b* so that it may be rotatably supported in the upper support recess of the upper housing 12*a* and the lower support recess of the lower housing 12*b*, and the upper support recess of the upper housing 12*a* and the lower support recess of the lower housing 12*b* may have a semicircular shape matching the outer circumferential surface of the transmission shaft. For example, as the third transmission shaft 33 is received between the third lower support recess 43*a* of the lower housing 12*b* and the upper support recess 46*a* of the upper housing 12*a* as illustrated in FIG. 19, the third transmission shaft 33 may be rotatably supported in the third lower support recess 43*a* of the lower housing 12*b* and the upper support recess 46*a* of the upper housing 12*a*. A support projection 46 may protrude from the upper housing 12*a* toward the lower housing 12*b*, and the upper support recess 46*a* may be provided in a bottom end of the support projection 46.

As set forth above, the vehicle hinge driving apparatus according to exemplary embodiments of the present disclosure may have a compact size to reduce the mounting space thereof and minimize loss in the space of the vehicle adjacent to the vehicle hinge. In addition, the vehicle hinge driving apparatus according to exemplary embodiments of the present disclosure may be commonly applied to various door systems, and thus the manufacturing cost thereof may be significantly reduced.

According to exemplary embodiments of the present disclosure, as the transmission mechanism includes one or more worm drives and one or more spur gear sets, the torque transmitted from the actuator to the output shaft may significantly increase, which may allow the actuator to rotate at low speeds, thus effectively achieving noise reduction and high quality.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle hinge driving apparatus comprising:

an actuator;

a housing connected to the actuator;

an output shaft rotatably mounted in the housing; and a transmission mechanism comprising a plurality of gear sets configured to transmit a torque from the actuator to the output shaft, wherein the plurality of gear sets comprises a proximal gear set close to the actuator, a first distal gear set operatively connected to the proximal gear set, and a second distal gear set operatively connected to the first distal gear set;

wherein the second distal gear set is detachably mounted and configured to respond to a required output torque;

wherein the output shaft is connected to the first distal gear set or the second distal gear set;

wherein the housing comprises:

a first mounting end to which the actuator is mounted;

a second mounting end to which the output shaft is mounted;

a first side surface;

a second side surface opposite the first side surface;

a first output-side support recess and a second output-side support recess provided in the second mounting end; and a cover that is detachably mounted to the second mounting end, the cover comprising a through hole through which the output shaft extends; and wherein a central vertical axis of the through hole is offset from a central vertical axis of the cover, wherein the first output-side support recess is adjacent to the first side surface, and the second output-side support recess is adjacent to the second side surface, and wherein the output shaft is rotatably supported in the first output-side support recess or the second output-side support recess.

2. The vehicle hinge driving apparatus according to claim 1, wherein:

the proximal gear set comprises a worm drive including a worm and a worm wheel; and each distal gear set comprises a spur gear set.

3. The vehicle hinge driving apparatus according to claim 1, wherein the housing comprises an upper housing and a lower housing, the upper housing being detachably mounted to the lower housing by a plurality of fasteners.

4. The vehicle hinge driving apparatus according to claim 3, wherein:

the transmission mechanism comprises a plurality of transmission shafts by which adjacent gear sets are connected; and at least one transmission shaft of the plurality of transmission shafts is rotatably supported between the upper housing and the lower housing.

5. The vehicle hinge driving apparatus according to claim 4, wherein:

the upper housing comprises an upper support recess;

the lower housing comprises a lower support recess; and the at least one transmission shaft of the plurality of transmission shafts is received between the upper support recess and the lower support recess.

6. A vehicle hinge driving apparatus comprising:

an actuator;

a housing connected to the actuator;

an output shaft rotatably mounted in the housing; and a transmission mechanism comprising a plurality of gear sets configured to transmit a torque from the actuator to the output shaft, wherein the plurality of gear sets comprises a proximal gear set close to the actuator, a first distal gear set operatively connected to the proximal gear set, and a second distal gear set operatively connected to the first distal gear set;

a hinge rod coupled to the output shaft, the hinge rod extending in a direction perpendicular to a central axis of the output shaft;

wherein the second distal gear set is detachably mounted and configured to respond to a required output torque;

wherein the output shaft is connected to the first distal gear set or the second distal gear set;

wherein the housing comprises:

a first mounting end to which the actuator is mounted;

a second mounting end to which the output shaft is mounted;

a first side surface;

a second side surface opposite the first side surface;

a first output-side support recess and a second output-side support recess provided in the second mounting end; and a cover that is detachably mounted to the second mounting end, the cover comprising a through hole through which the output shaft extends; and wherein a central vertical axis of the through hole is offset from a central vertical axis of the cover, wherein the first output-side support recess is adjacent to the first side surface, and the second output-side support recess is adjacent to the second side surface, and wherein the output shaft is rotatably supported in the first output-side support recess or the second output-side support recess.

7. The vehicle hinge driving apparatus according to claim 6, wherein:

the hinge rod comprises a through hole through which the output shaft extends;

the output shaft comprises a plurality of first projections and a plurality of first recesses alternately arranged in a circumferential direction of the output shaft;

the hinge rod comprises a plurality of second recesses and a plurality of second projections alternately arranged on an inner circumferential surface of the through hole in a circumferential direction of the through hole;

the first projections of the output shaft are fitted into the second recesses of the hinge rod, respectively; and the second projections of the hinge rod are fitted into the first recesses of the output shaft, respectively.

8. The vehicle hinge driving apparatus according to claim 7, wherein the output shaft comprises an annular recess extending in the circumferential direction of the output shaft; and the annular recess is provided in the first projections of the output shaft in the circumferential direction of the output shaft.

9. The vehicle hinge driving apparatus according to claim 6, wherein:

the proximal gear set comprises a worm drive including a worm and a worm wheel; and each distal gear set comprises a spur gear set.

10. The vehicle hinge driving apparatus according to claim 6, wherein:

the housing comprises an upper housing and a lower housing, the upper housing being detachably mounted to the lower housing by a plurality of fasteners;

the transmission mechanism comprises a plurality of transmission shafts by which adjacent gear sets are connected; and at least one transmission shaft of the plurality of transmission shafts is rotatably supported between the upper housing and the lower housing.

11. The vehicle hinge driving apparatus according to claim 10, wherein:

the upper housing comprises an upper support recess;

the lower housing comprises a lower support recess; and the at least one transmission shaft of the plurality of transmission shafts is received between the upper support recess and the lower support recess.

12. A vehicle comprising:

a vehicle body;

a door component coupled to the vehicle body by a vehicle hinge; and a vehicle hinge driver configured to drive the vehicle hinge, the vehicle hinge driver comprising:

an actuator;

a housing connected to the actuator;

an output shaft rotatably mounted in the housing; and a transmission mechanism comprising a plurality of gear sets configured to transmit a torque from the actuator to the output shaft, wherein the plurality of gear sets comprises a proximal gear set close to the actuator, a first distal gear set operatively connected to the proximal gear set, and a second distal gear set operatively connected to the first distal gear set;

wherein the second distal gear set is detachably mounted and configured to respond to a required output torque;

wherein the output shaft is connected to the first distal gear set or the second distal gear set;

wherein the housing comprises:

a first mounting end to which the actuator is mounted;

a second mounting end to which the output shaft is mounted;

a first side surface;

a second side surface opposite the first side surface;

a first output-side support recess and a second output-side support recess provided in the second mounting end; and a cover that is detachably mounted to the second mounting end, the cover comprising a through hole through which the output shaft extends; and wherein a central vertical axis of the through hole is offset from a central vertical axis of the cover, wherein the first output-side support recess is adjacent to the first side surface, and the second output-side support recess is adjacent to the second side surface, and wherein the output shaft is rotatably supported in the first output-side support recess or the second output-side support recess.

13. The vehicle according to claim 12, wherein:

the housing comprises an upper housing and a lower housing, the upper housing being detachably mounted to the lower housing by a plurality of fasteners;

the upper housing comprises an upper support recess;

the lower housing comprises a lower support recess;

the transmission mechanism comprises a plurality of transmission shafts by which adjacent gear sets are connected; and at least one transmission shaft of the plurality of transmission shafts is rotatably supported between the upper support recess and the lower support recess.

14. The vehicle hinge according to claim 12, wherein:

the proximal gear set comprises a worm drive including a worm and a worm wheel; and each distal gear set comprises a spur gear set.

15. The vehicle hinge according to claim 12, wherein the housing comprises an upper housing and a lower housing, the upper housing being detachably mounted to the lower housing by a plurality of fasteners.

16. The vehicle hinge according to claim 15, wherein the transmission mechanism comprises a plurality of transmission shafts by which adjacent gear sets are connected.

17. The vehicle hinge according to claim 16, wherein:

the upper housing comprises an upper support recess;

the lower housing comprises a lower support recess; and at least one transmission shaft of the plurality of transmission shafts is received between the upper support recess and the lower support recess.

* * * * *